(12) United States Patent
Vaddi et al.

(10) Patent No.: US 11,536,247 B2
(45) Date of Patent: Dec. 27, 2022

(54) SYSTEM AND METHOD FOR IMPROVED EXTREME LOAD CONTROL FOR WIND TURBINE COMPONENTS

(71) Applicant: General Electric Company, Schenectady, NY (US)

(72) Inventors: Prashanth Kumar Reddy Vaddi, Bangalore (IN); Dhanesh Chandrashekar Pathuvoth, Bangalore (IN); Venkata Krishna Vadlamudi, Bangalore (IN)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 16/662,487

(22) Filed: Oct. 24, 2019

(65) Prior Publication Data

US 2021/0123413 A1    Apr. 29, 2021

(51) Int. Cl.
| | |
|---|---|
| *F03D 7/02* | (2006.01) |
| *F03D 17/00* | (2016.01) |
| *F03D 7/04* | (2006.01) |

(52) U.S. Cl.
CPC ........... *F03D 7/0224* (2013.01); *F03D 7/042* (2013.01); *F03D 17/00* (2016.05);
(Continued)

(58) Field of Classification Search
CPC ........ F03D 7/0224; F03D 7/042; F03D 17/00; F03D 7/0292; F05B 2270/1095;
(Continued)

(56) References Cited

U.S. PATENT DOCUMENTS

| | | | | |
|---|---|---|---|---|
| 2013/0064663 | A1* | 3/2013 | Loth | F03D 1/0675 29/889.71 |
| 2016/0138571 | A1* | 5/2016 | Perley | F03D 17/00 702/42 |
| 2016/0237988 | A1 | 8/2016 | Perley et al. | |

FOREIGN PATENT DOCUMENTS

| | | |
|---|---|---|
| CN | 106368898 A | 2/2017 |
| EP | 2000667 A1 | 12/2008 |

(Continued)

OTHER PUBLICATIONS

European Search Report for EP Application No. 20203630.7, dated Mar. 19, 2021.

*Primary Examiner* — Rocio Del Mar Perez-Velez
*Assistant Examiner* — Christopher W Carter
(74) *Attorney, Agent, or Firm* — Dority & Manning, P.A.

(57) ABSTRACT

A method for reducing extreme loads acting on a component of a wind turbine includes measuring, via one or more sensors, a plurality of operating parameters of the wind turbine. Further, the method includes predicting at least one blade moment of at least one rotor blade of the wind turbine based on the plurality of operating parameters. The method also includes predicting a load and an associated load angle of the at least one rotor blade as a function of the at least one blade moment. Moreover, the method includes predicting a pitch angle of the at least one rotor blade of the wind turbine. In addition, the method includes generating a load envelope for the component that comprises at least one load value for the pitch angle and the load angle. Thus, the method includes implementing a control action when the load is outside of the load envelope.

16 Claims, 7 Drawing Sheets

(52) U.S. Cl.
CPC . *F05B 2270/1095* (2013.01); *F05B 2270/328* (2013.01); *F05B 2270/331* (2013.01); *F05B 2270/332* (2013.01)

(58) Field of Classification Search
CPC .......... F05B 2270/328; F05B 2270/331; F05B 2270/332; F05B 2260/821; F05B 2270/30; F05B 2270/329; F05B 2270/335; Y02E 10/72
See application file for complete search history.

(56) References Cited

FOREIGN PATENT DOCUMENTS

EP           2781738 A1    9/2014
WO    WO 2012/136277 A1    10/2012

\* cited by examiner

SYSTEM AND METHOD FOR IMPROVED EXTREME LOAD CONTROL FOR WIND TURBINE COMPONENTS

FIELD

The present subject matter relates generally to wind turbines and, more particularly, to a system and method for improving extreme load control for wind turbine components, such as rotor blades, pitch bearings, and the hub.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e. design loads) of the individual wind turbine components. For example, the blade root of a wind turbine may experience loads (e.g. a blade root resultant moment) associated with both average loading due to turbine operation and dynamically fluctuating loads due to environmental conditions. Such loading may damage turbine components, thereby eventually causing the turbine components to fail. The fluctuating loads can change day-to-day or season-to-season and may be based on wind speed, wind peaks, wind turbulence, wind shear, changes in wind direction, density in the air, yaw misalignment, upflow, or similar. Specifically, for example, loads experienced by a wind turbine may vary with wind speed.

As such, it is imperative to ensure loads acting on the wind turbine do not exceed design loads. Thus, many wind turbines employ one or more sensors configured to measure the loads acting on the various wind turbine components. Though the sensors may provide the desired information, new sensor systems can be complex and expensive to install. Further, the sensors may provide inaccurate information and can be prone to fail.

Additionally, wind turbines utilize control systems configured to estimate loads acting on the wind turbine based on a wind turbine thrust. The terms "thrust," "thrust value," "thrust parameter" or similar as used herein are meant to encompass a force acting on the wind turbine due to the wind. The thrust force comes from a change in pressure as the wind passes the wind turbine and slows down. Such control strategies estimate loads acting on the wind turbine by determining an estimated thrust using a plurality of turbine operating conditions, such as, for example, pitch angle, power output, generator speed, and air density. The operating conditions are inputs for the algorithm, which includes a series of equations, one or more aerodynamic performance maps, and one or more look-up tables (LUTs). For example, the LUT may be representative of a wind turbine thrust. A +/− standard deviation of the estimated thrust may also be calculated, along with an operational maximum thrust and a thrust limit. As such, the wind turbine may be controlled based on a difference between the maximum thrust and the thrust limit.

Such existing controls, however, are tuned to minimize the blade root resultant moment irrespective of the load direction and pitch angle, thus always targeting the worst case situation. Accordingly, such controls operate conservatively using additional pitch travel and also giving up annual energy production in the process.

In view of the foregoing, the art is continuously seeking new and improved systems for controlling extreme loads of wind turbine components, such as rotor blades, pitch bearings, and the hub that address the aforementioned issues.

BRIEF DESCRIPTION

Aspects and advantages of the invention will be set forth in part in the following description, or may be obvious from the description, or may be learned through practice of the invention.

In one aspect, the present subject matter is directed to a method for reducing extreme loads acting on a component of a wind turbine. The method includes measuring, via one or more sensors, a plurality of operating parameters of the wind turbine. Further, the method includes predicting, via a processor, at least one blade moment of at least one rotor blade of the wind turbine based on the plurality of operating parameters. The method also includes predicting, via the processor, a load (e.g. such as a blade root resultant moment) and an associated load angle of the at least one rotor blade as a function of the at least one blade moment. Moreover, the method includes predicting, via the processor, a pitch angle of the at least one rotor blade of the wind turbine. In addition, the method includes generating, via the processor, a load envelope for the component that comprises at least one load value for the pitch angle and the load angle. Thus, the method includes implementing, via a controller, a control action when the load is outside of the load envelope.

In an embodiment, the component may include, for example, the rotor blade, a pitch bearing, or a hub of the wind turbine. In another embodiment, the plurality of operating parameters of the wind turbine may include any one of or a combination of the following: rotor position, thrust, loads, power, speed, torque, blade weight, gravity, pitch angle, nodding moment, overhang moment, bearing lubrication schedule, a rotor azimuth angle, and/or a yawing moment.

In further embodiments, predicting the blade moment(s) of the rotor blade of the wind turbine may include calculating an edgewise blade moment of the rotor blade as a function of the plurality of operating parameters and estimated states of the wind turbine. In addition, predicting the blade moment(s) of the rotor blade of the wind turbine may include calculating a blade flap moment of the rotor blade as a function of the rotor position, the blade weight, and the torque.

In several embodiments, predicting the load and the associated load angle as a function of the blade moment(s) may include calculating the load and the associated load angle as a function of the edgewise blade moment of the rotor blade and the blade flap moment of the rotor blade. In such embodiments, calculating the load and the associated load angle as a function of the edgewise blade moment of the rotor blade and the blade flap moment of the rotor blade may include calculating the associated load angle by dividing the blade flap moment of the rotor blade by the edgewise blade moment of the rotor blade and calculating the load as a function of the associated load angle.

In particular embodiments, predicting the pitch angle of the rotor blade(s) of the wind turbine may include calculating the pitch angle of the rotor blade(s) of the wind turbine based on one or more controller commands.

In further embodiments, implementing the control action when the load is outside of the load envelope may include pitching the rotor blade(s). In such embodiments, pitching the rotor blade(s) may include collective pitching of a plurality of rotor blades of the wind turbine, independently pitching each of the plurality of rotor blades, and/or cyclically pitching each of the plurality of rotor blades.

In another aspect, the present disclosure is directed to a system for reducing extreme loads acting on a component of a wind turbine. The system includes one or more sensors configured to measure a plurality of operating parameters of the wind turbine and a controller configured with the one or more sensors. The controller includes a processor configured to perform a plurality of operations, including but not limited to predicting at least one blade moment of at least one rotor blade of the wind turbine based on the plurality of operating parameters, predicting a load and an associated load angle of the rotor blade(s) as a function of the blade moment(s), the load corresponding to a blade root resultant moment of the rotor blade(s), predicting a pitch angle of the rotor blade(s) of the wind turbine, generating a load envelope for the component that includes at least one load value for the pitch angle and the load angle, and implementing a control action when the load is outside of the load envelope.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for improved extreme load control for wind turbine components, such as the rotor blades, pitch bearings, and the hub. More specifically, the method aims to use an extreme component envelope at each load angle and pitch angle. For example, the load magnitude and load angles are predicted using the imbalance load measurements, thrust estimates, and the rotor position, along with pitch angle predictions. The predicted load magnitude is compared against the load envelope to determine the necessary control action. Thus, the present disclosure limits unnecessary pitching and energy loss associated with controlling for a single extreme load.

In a particular embodiment, for example, margins on certain wind turbine components are determined using a load envelope of load angles and blade pitch angles. The data is used in the controller to determine how close the wind turbine is operating to the stress limit. The controller uses proximity sensor information and estimated states to predict the edgewise blade load. Similarly, the twisting moment may be predicted based on the rotor position, stored weight data, and rotor torque. The combined information is used to predict the load angle and magnitude. The pitch angle may also be predicted based on controller commands. Such information may then be used to compare against the envelope information. The controller then acts to reduce the load using this information when an exceedance is predicted.

Figure 1:
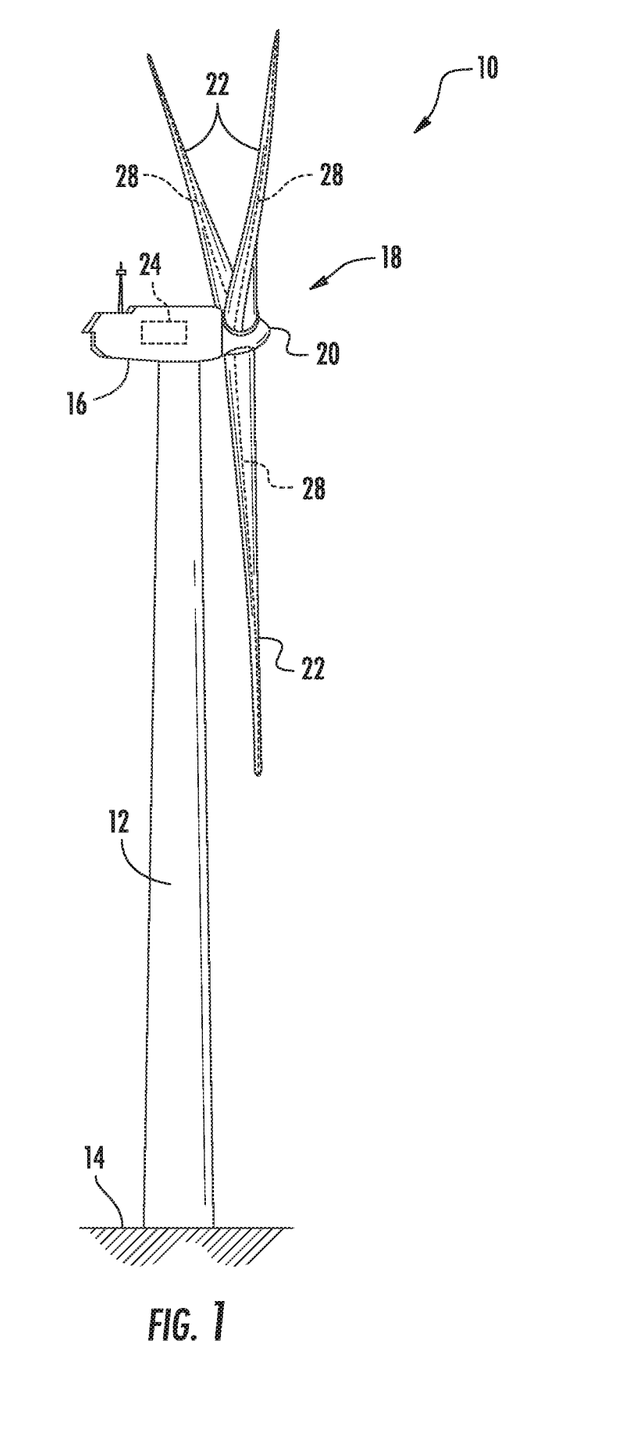
FIG. 1 illustrates a perspective view of one embodiment of a wind turbine according to the present disclosure.

Referring now to FIG. 1, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 2:
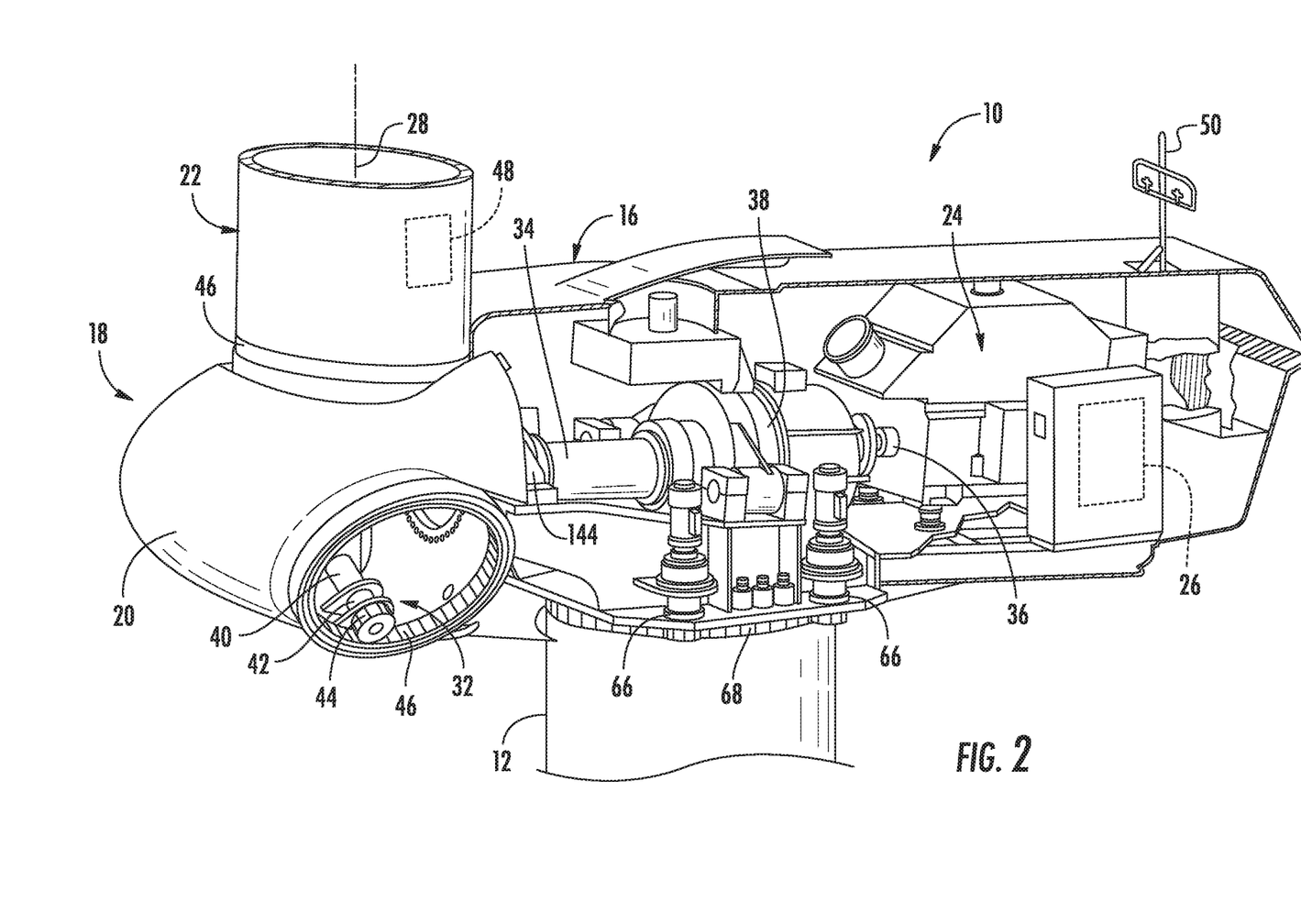
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for measuring various operating parameters that may be required to various blade moments as described in more detail below. For example, in various embodiments, the sensors may include blade sensors 48 for measuring a pitch angle of one of the rotor blades 22 or for measuring a load acting on one of the rotor blades 22; generator sensors (not shown) for monitoring the generator 24 (e.g. torque, rotational speed, acceleration and/or the power output); sensors for measuring the imbalance loading in the rotor (e.g. main shaft bending sensors); and/or various wind sensors 50 for measuring various wind parameters, such as wind speed, wind peaks, wind turbulence, wind shear, changes in wind direction, air density, or similar. Further, the sensors may be located near the ground of the wind turbine, on the nacelle, or on a meteorological mast of the wind turbine. It should also be understood that any other number or type of sensors may be employed and at any location. For example, the sensors may be Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
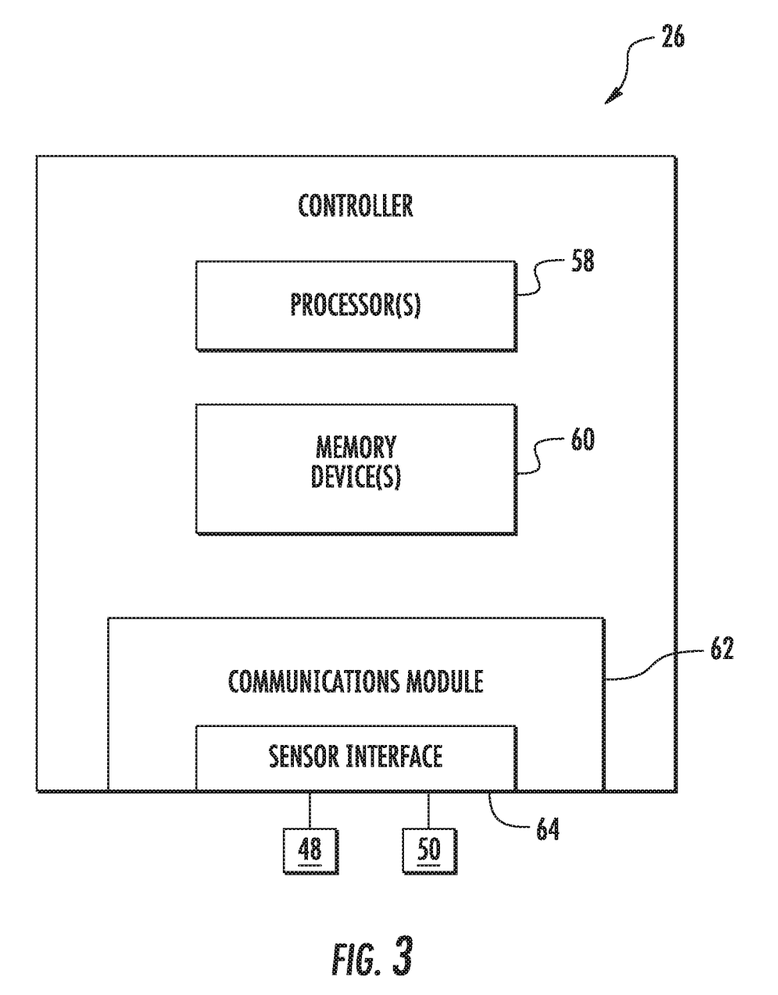
FIG. 3 illustrates a schematic diagram of one embodiment of a controller according to the present disclosure.

Referring now to FIG. 3, there is illustrated a block diagram of one embodiment of various components of the controller 26 according to the present disclosure. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50 may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

Figure 4:
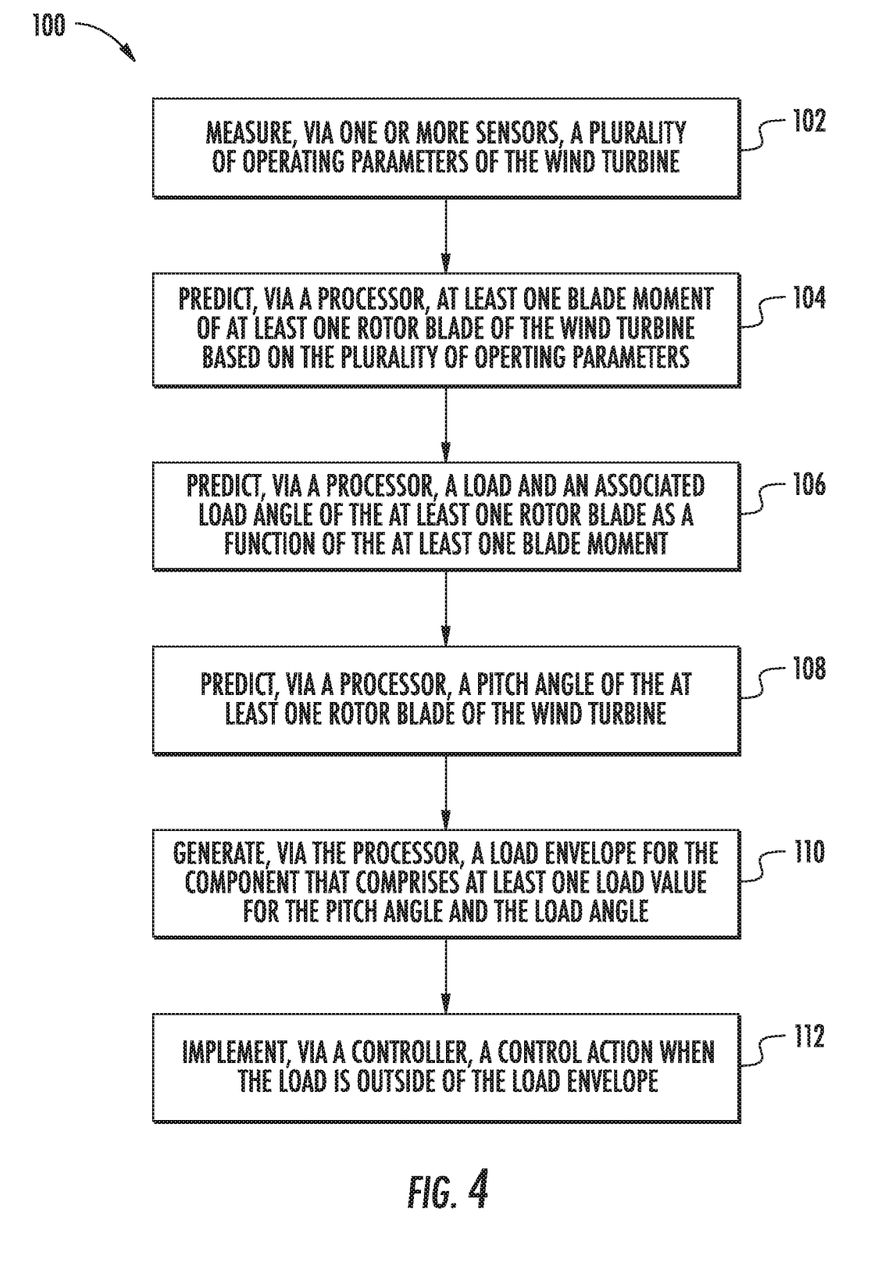
FIG. 4 illustrates a flow diagram of one embodiment of a method for reducing extreme loads acting on a component of a wind turbine according to the present disclosure.

Referring now to FIG. 4, a flow diagram of method 100 for reducing extreme loads acting on a component of a wind turbine according to one embodiment of the present disclosure is illustrated. In an embodiment, for example, the component may include, for example, one of the rotor blades 22, the pitch bearing 46, or the hub 20 of the wind turbine 10. The method 100 is described herein as implemented using, for example, the wind turbine 10 described above. However, it should be appreciated that the disclosed method 100 may be implemented using any other suitable wind turbine now known or later developed in the art. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes measuring, via one or more sensors, a plurality of operating parameters of the wind turbine 10. For example, in one embodiment, sensors 48, 50 are configured to measure or otherwise monitor the various operating parameters of the wind turbine 10. More specifically, as mentioned, the operating parameters may include any one of or a combination of the following: rotor position, thrust, loads, power, speed, torque, blade weight, gravity, pitch angle, nodding moment, overhang moment, bearing lubrication schedule, a rotor azimuth angle, and/or a yawing moment.

Figure 5:
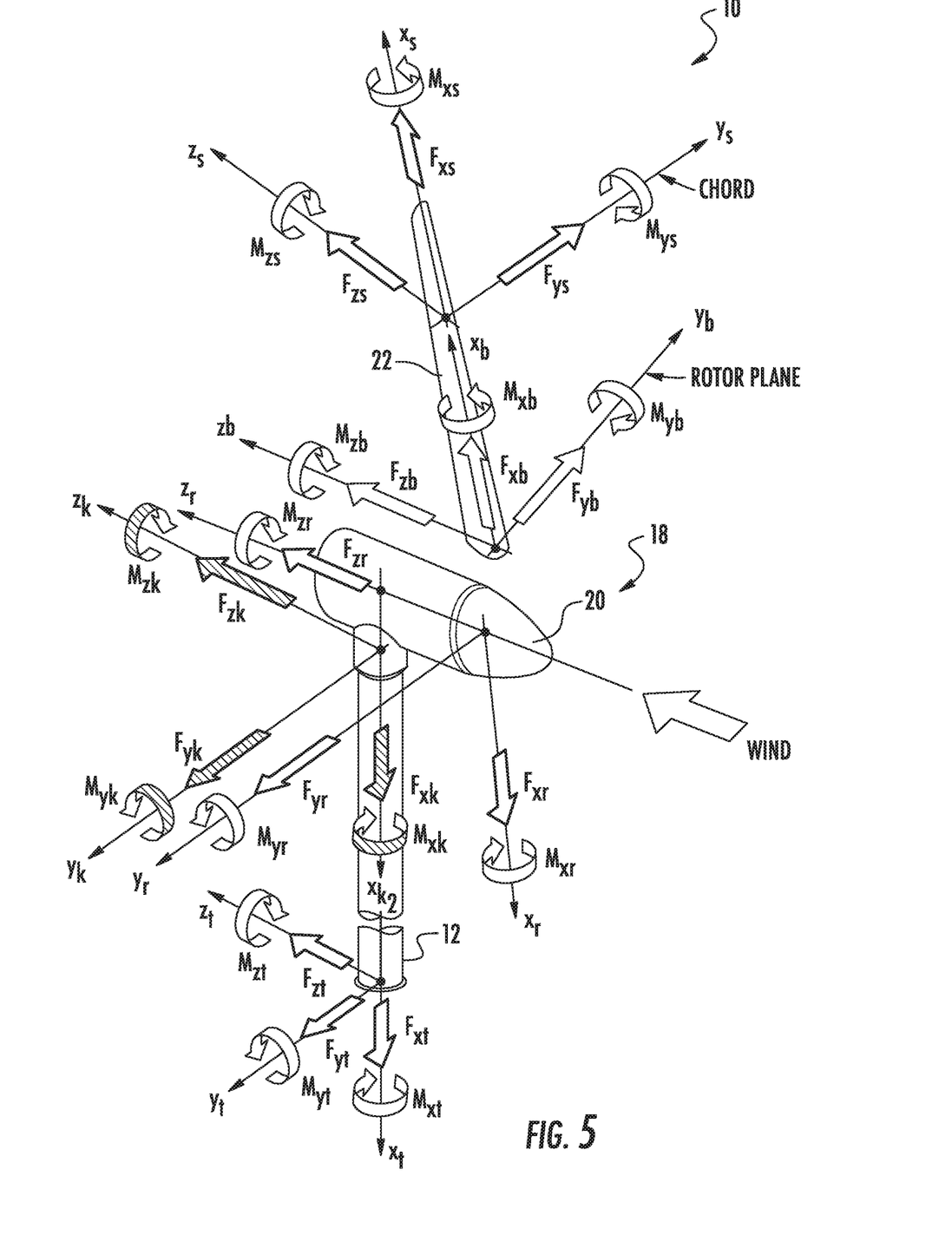
FIG. 5 illustrates a perspective view of one embodiment of a wind turbine according to the present disclosure, particularly illustrating various axes of rotation and corresponding forces and moments acting on the wind turbine.

Thus, as shown at (104), the method 100 includes predicting, via the processor 58, at least one blade moment of the rotor blade(s) 22 of the wind turbine 10 based on the plurality of operating parameters. For example, as shown in FIG. 5, an exploded view of one embodiment of the wind turbine 10 is shown, particularly illustrating various axes of rotation and corresponding forces and moments acting on the wind turbine 10. The peak loads of the wind turbine 10 may vary between turbines, but in general, typically correspond to at least one of the following: the blade root resultant moment (e.g. $M_{rB}$, which includes pitch and hub loads $M_{xB}$, $M_{yb}$, and $M_{zb}$), main shaft loads (e.g. $M_{yr}$, $M_{zr}$), main bearing loads (e.g. $M_{xr}$, $M_{yr}$), yaw drive loads (e.g. $M_{xk}$), yaw bolts/bearing/flange loads (e.g. $M_{yk}$, $M_{zk}$) or tower bending loads (e.g. $M_{xt}$, $M_{yr}$, and $M_{zt}$). It should be understood that the peak loads as described herein may also include any additional loads experienced by the wind turbine 10 and that the loads illustrated in FIG. 5 are provided for example purposes only.

Thus, in particular embodiments, the processor 58 may be configured to calculate an edgewise blade moment ($M_{yB}$) of the rotor blade(s) 22 as a function of the operating parameters and estimated states of the wind turbine 10. In addition, the processor 58 may be configured to predict calculate blade flap moment ($M_{zB}$) of the rotor blade(s) 22 as a function of the rotor position, the blade weight, and the torque.

Referring back to FIG. 4, as shown at (106), the method 100 includes predicting, via the processor 58, a load (e.g. such as the blade root resultant moment, $M_{rB}$) and an associated load angle of the rotor blade(s) 22 as a function of the blade moments described herein. For example, in several embodiments, the processor 58 may be configured to calculate the load and the associated load angle as a function of the edgewise blade moment of the rotor blade(s) 22 and the blade flap moment of the rotor blade(s) 22. More specifically, in such embodiments, the processor 58 may be configured to calculate the associated load angle by dividing the blade flap moment of the rotor blade(s) 22 by the edgewise blade moment of the rotor blade(s) 22 and calculating the load as a function of the associated load angle.

As shown at (108), the method 100 includes predicting, via the processor 58, a pitch angle of the rotor blade(s) 22 of the wind turbine 10. In particular embodiments, for example, the processor 58 is configured to predict the pitch angle of the rotor blade(s) 22 by calculating the pitch angle of the rotor blade(s) of the wind turbine as a function of one or more controller commands.

As shown at (110), the method 100 includes generating, via the processor 58, a load envelope for the component that includes one or more load values for the pitch angle and the load angle. For example, FIGS. 6A and 6B each illustrate examples of a load envelope according to the present disclosure.

Referring back to FIG. 4, as shown at (112), the method 100 includes implementing, via the controller 26, a control action when the load is outside of the load envelope. For example, in particular embodiments, the control action may include pitching the rotor blade(s) 22. More specifically, in such embodiments, pitching the rotor blade(s) 22 may include collective pitching of a plurality of rotor blades 22 of the wind turbine 10, independently pitching each of the plurality of rotor blades 22, and/or cyclically pitching each of the plurality of rotor blades 22.

Figure 6A:
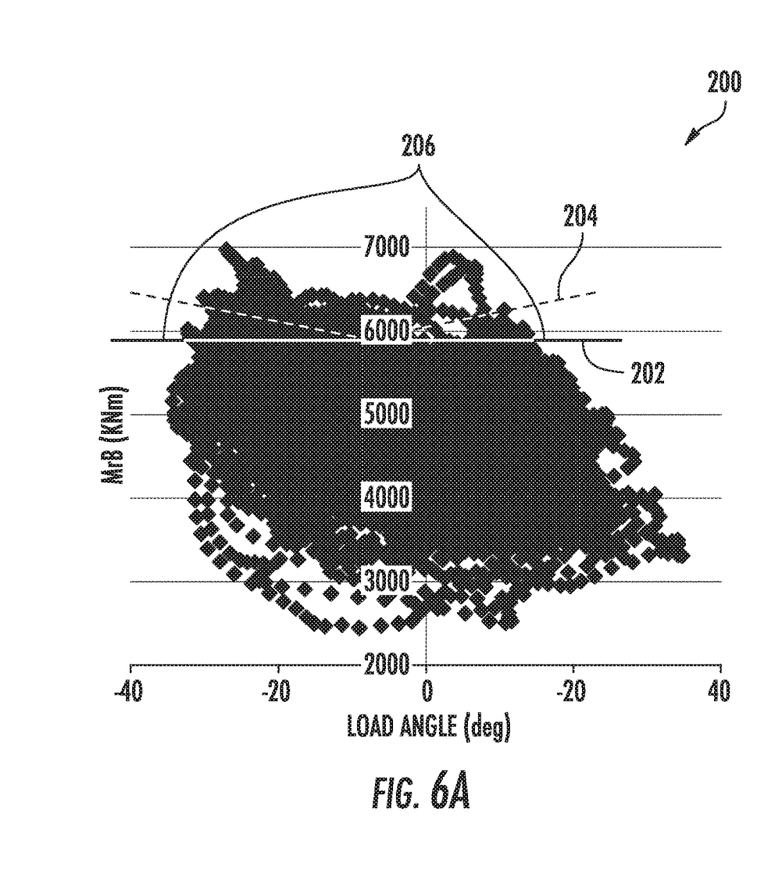
FIG. 6A illustrates a graph of one embodiment of the blade resultant moment (MrB) (y-axis) versus the load angle (x-axis) from a time series near rated wind speed with RIC always on according to the present disclosure.
Figure 6B:
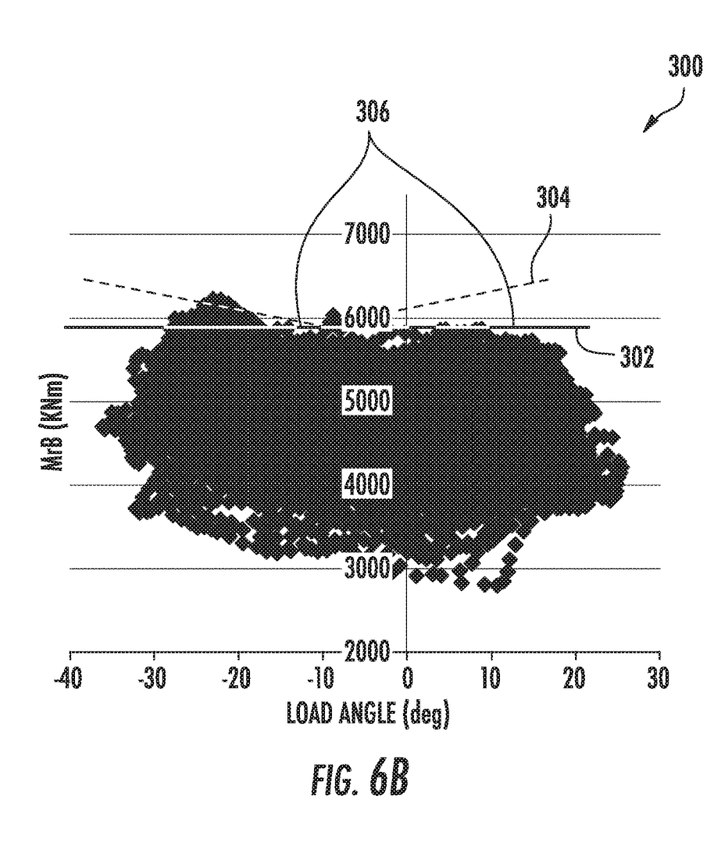
FIG. 6B illustrates a graph of one embodiment of the blade resultant moment (MrB) (y-axis) versus the load angle (x-axis) from a time series near rated wind speed without RIC on according to the present disclosure.

Advantages of the present disclosure can be better understood with respect to FIGS. 6A and 6B. More specifically, as shown, graphs 200, 300 illustrate the blade resultant moment (MrB) (y-axis) versus the load angle (x-axis) from a time series near rated wind speed according to the present disclosure. The graph 200 of FIG. 6A illustrates a scenario with RIC always on, whereas the graph 300 of FIG. 6B illustrates a scenario with without RIC on. The conventional load thresholds are represented as lines 202, 302, respectively, in each of FIGS. 6A and 6B, whereas the load thresholds of the present disclosure are represented as lines 204, 304, respectively. Thus, as shown, the load thresholds 204, 304 of the present disclosure avoid MrB control activations for all points within areas 206, 306. This is advantageous as the number of activations correlates to energy loss and additional pitching from MrB control.

It should be further understood that the control action as described herein may encompass any suitable command or constraint by the controller 26. For example, in several embodiments, the control action may include temporarily de-rating or up-rating the wind turbine to prevent excessive loads on one or more of the wind turbine components. Up-rating the wind turbine, such as by up-rating torque, may temporarily slow down the wind turbine and act as a brake to help reduce or prevent loading. De-rating the wind turbine may include speed de-rating, torque de-rating or a combination of both. Further, as mentioned, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). As such, in one embodiment, the controller 26 may command a new pitch setpoint (e.g. from 0 degrees to 5 degrees), whereas in another embodiment, the controller 26 may specify a new pitch constraint (e.g. a constraint to ensure that subsequent pitch commands are at least 5 degrees).

In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 22 to change the angle of the nacelle 16 relative to the direction of the wind. In further embodiments, the controller 26 may be configured to actuate one or more mechanical brake(s) in order to reduce the rotational speed of the rotor blades 22, thereby reducing component loading. In still further embodiments, the controller 26 may be configured to perform any appropriate control action known in the art. Further, the controller 26 may implement a combination of two or more control actions.

Figure 7:
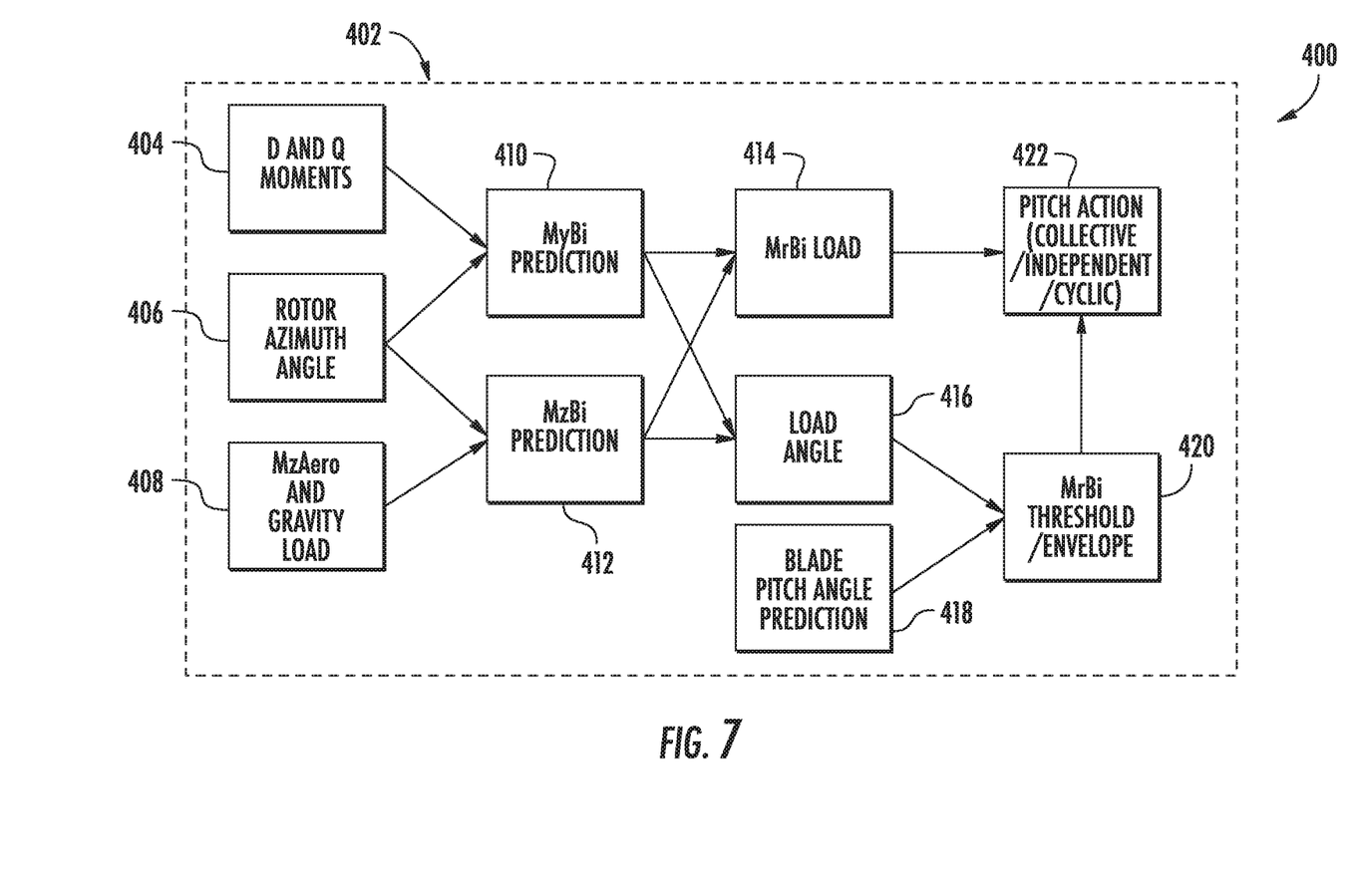
FIG. 7 illustrates a schematic diagram of one embodiment of a system for reducing extreme loads acting on a component of a wind turbine according to the present disclosure.

Referring now to FIG. 6, a schematic flow diagram of a particular embodiment of a system 400 for reducing extreme loads acting on a component of a wind turbine according to the present disclosure is illustrated. As shown, the system 400 may include a controller 402 that receives D and Q moments 404, a rotor azimuth angle 406, and a gravitational load 408. The controller 402 may then determine the MyB and the MzB moments 410, 412 based on the received inputs. As shown at 414, the controller 402 may determine the MrB load using the MyB and the MzB moments 410, 412. Further, as shown at 416, the controller 402 may also determine the load angle using the MyB and the MzB moments 410, 412. As shown at 418, the controller 402 can also predict the pitch angle. Thus, as shown at 420, the controller 402 can determined the MrB threshold/envelope based on the load angle and the pitch angle. The MrB load 414 and the MrB threshold/envelope 420 can then be used to determine the pitch action (e.g. collective/independent/cyclic).

Various aspects and embodiments of the present invention are defined by the following numbered clauses:

Clause 1. A method for reducing extreme loads acting on a component of a wind turbine, the method comprising:
measuring, via one or more sensors, a plurality of operating parameters of the wind turbine;
predicting, via a processor, at least one blade moment of at least one rotor blade of the wind turbine based on the plurality of operating parameters;
predicting, via the processor, a load and an associated load angle of the at least one rotor blade as a function of the at least one blade moment;
predicting, via the processor, a pitch angle of the at least one rotor blade of the wind turbine;
generating, via the processor, a load envelope for the component that comprises at least one load value for the pitch angle and the load angle; and, implementing, via a controller, a control action when the load is outside of the load envelope.

Clause 2. The method of clause 1, wherein the component comprises at least one of the rotor blade, a pitch bearing, or a hub of the wind turbine.

Clause 3. The method of any of the preceding clauses, wherein the plurality of operating parameters of the wind turbine comprise at least one of the following: rotor position, thrust, loads, power, speed, torque, blade weight, gravity, pitch angle, nodding moment, overhang moment, bearing lubrication schedule, a rotor azimuth angle, or a yawing moment.

Clause 4. The method of any of the preceding clauses, wherein predicting the at least one blade moment of the rotor blade of the wind turbine further comprises: calculating an edgewise blade moment of the rotor blade as a function of the plurality of operating parameters and estimated states of the wind turbine.

Clause 5. The method of any of the preceding clauses, wherein predicting the at least one blade moment of the rotor blade of the wind turbine further comprises: calculating a blade flap moment of the rotor blade as a function of the rotor position, the blade weight, and the torque.

Clause 6. The method of any of the preceding clauses, wherein predicting the load and the associated load angle as a function of the at least one blade moment further comprises:
calculating the load and the associated load angle as a function of the edgewise blade moment of the rotor blade and the blade flap moment of the rotor blade.

Clause 7. The method of any of the preceding clauses, wherein
calculating the load and the associated load angle as a function of the edgewise blade moment of the rotor blade and the blade flap moment of the rotor blade further comprises:
calculating the associated load angle by dividing the blade flap moment of the rotor blade by the edgewise blade moment of the rotor blade; and, calculating the load as a function of the associated load angle.

Clause 8. The method of any of the preceding clauses, wherein predicting the pitch angle of the at least one rotor blade of the wind turbine further comprises calculating the pitch angle of the at least one rotor blade of the wind turbine based on one or more controller commands.

Clause 9. The method of any of the preceding clauses, wherein the load of the at least one rotor blade comprises a blade root resultant moment.

Clause 10. The method of any of the preceding clauses, wherein implementing the control action when the load is outside of the load envelope further comprises pitching the at least one rotor blade.

Clause 11. The method of any of the preceding clauses, wherein the pitching the at least one rotor blade further comprises at least one of collective pitching of a plurality of rotor blades of the wind turbine, independently pitching each of the plurality of rotor blades, or cyclically pitching each of the plurality of rotor blades.

Clause 12. A system for reducing extreme loads acting on a component of a wind turbine, the system comprising:
one or more sensors configured to measure a plurality of operating parameters of the wind turbine;
a controller configured with the one or more sensors, the controller comprising a processor configured to perform a plurality of operations, the plurality of operations comprising:
predicting at least one blade moment of at least one rotor blade of the wind turbine based on the plurality of operating parameters;
predicting a load and an associated load angle of the at least one rotor blade as a function of the at least one blade moment, the load corresponding to a blade root resultant moment of the at least one rotor blade;
predicting a pitch angle of the at least one rotor blade of the wind turbine;

generating a load envelope for the component that comprises at least one load value for the pitch angle and the load angle; and, implementing a control action when the load is outside of the load envelope.

Clause 13. The system of clause 12, wherein the component comprises at least one of the rotor blade, a pitch bearing, or a hub of the wind turbine.

Clause 14. The system of clauses 12-13, wherein the plurality of operating parameters of the wind turbine comprise at least one of the following: rotor position, thrust, loads, power, speed, torque, blade weight, gravity, pitch angle, nodding moment, overhang moment, bearing lubrication schedule, a rotor azimuth angle, or a yawing moment.

Clause 15. The system of clauses 12-14, wherein predicting the at least one blade moment of the rotor blade of the wind turbine further comprises:

calculating an edgewise blade moment of the rotor blade as a function of the plurality of operating parameters and estimated states of the wind turbine; and, calculating a blade flap moment of the rotor blade as a function of the rotor position, the blade weight, and the torque.

Clause 16. The system of clauses 12-15, wherein predicting the load and the associated load angle as a function of the at least one blade moment further comprises:

calculating the load and the associated load angle as a function of the edgewise blade moment of the rotor blade and the blade flap moment of the rotor blade.

Clause 17. The system of clauses 12-16, wherein calculating the load and the associated load angle as a function of the edgewise blade moment of the rotor blade and the blade flap moment of the rotor blade further comprises:

calculating the associated load angle by dividing the blade flap moment of the rotor blade by the edgewise blade moment of the rotor blade; and, calculating the load as a function of the associated load angle.

Clause 18. The system of clauses 12-17, wherein predicting the pitch angle of the at least one rotor blade of the wind turbine further comprises calculating the pitch angle of the at least one rotor blade of the wind turbine based on one or more controller commands.

Clause 19. The system of clauses 12-18, wherein the one or more sensors comprise proximity sensors.

Clause 20. The system of clauses 12-19, wherein implementing the control action when the load is outside of the load envelope further comprises pitching the at least one rotor blade, wherein the pitching the at least one rotor blade further comprises at least one of collective pitching of a plurality of rotor blades of the wind turbine, independently pitching each of the plurality of rotor blades, or cyclically pitching each of the plurality of rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing extreme loads acting on a component of a wind turbine, the wind turbine having at least one rotor blade, the method comprising:

measuring, via one or more sensors at the at least one rotor blade, a plurality of operating parameters of the wind turbine;

calculating, via a processor, an edgewise blade moment and a blade flap moment of the at least one rotor blade as a function of the plurality of operating parameters of the wind turbine;

predicting, via the processor, a load and an associated load angle of the at least one rotor blade as a function of the edgewise blade moment and the blade flap moment of the at least one rotor blade, wherein the load of the at least one rotor blade comprises a blade root resultant moment;

predicting, via the processor, a pitch angle of the at least one rotor blade of the wind turbine;

generating, via the processor, a load envelope for the component that comprises at least one load value for the pitch angle and the load angle; and, implementing, via a controller, a control action comprising pitching the at least one rotor blade when the load is outside of the load envelope.

2. The method of claim 1, wherein the component comprises at least one of a rotor blade, a pitch bearing, or a hub of the wind turbine.

3. The method of claim 1, wherein the plurality of operating parameters of the wind turbine comprise at least one of the following: rotor position, thrust, loads, power, speed, torque, blade weight, gravity, pitch angle, nodding moment, overhang moment, bearing lubrication schedule, a rotor azimuth angle, or a yawing moment.

4. The method of claim 3, further comprising calculating the edgewise blade moment of the at least one rotor blade as a function of the plurality of operating parameters and estimated states of the wind turbine.

5. The method of claim 4, further comprising calculating the blade flap moment of the at least one rotor blade as a function of the rotor position, the blade weight, and the torque.

6. The method of claim 5, wherein predicting the load and the associated load angle of the at least one rotor blade as a function of the edgewise blade moment and the blade flap moment of the at least one rotor blade further comprises:

calculating the associated load angle by dividing the blade flap moment of the rotor blade by the edgewise blade moment of the rotor blade; and, calculating the load as a function of the associated load angle.

7. The method of claim 1, wherein predicting the pitch angle of the at least one rotor blade of the wind turbine further comprises calculating the pitch angle of the at least one rotor blade of the wind turbine based on one or more controller commands.

8. The method of claim 1, wherein the pitching the at least one rotor blade further comprises at least one of collective pitching of a plurality of rotor blades of the wind turbine, independently pitching each of the plurality of rotor blades, or cyclically pitching each of the plurality of rotor blades.

9. A system for reducing extreme loads acting on a component of a wind turbine, the wind turbine having at least one rotor blade, the system comprising:

one or more sensors at the at least one rotor blade configured to measure a plurality of operating parameters of the wind turbine, wherein the plurality of operating parameters comprise at least one of the following: rotor position, blade weight, and torque;

a controller configured with the one or more sensors, the controller comprising a processor configured to perform a plurality of operations, the plurality of operations comprising:

calculating an edgewise blade moment of the at least one rotor blade as a function of the plurality of operating parameters of the wind turbine;

calculating an edgewise blade moment and a blade flap moment of the at least one rotor blade as a function of the rotor position, the blade weight, and the torque of the at least one rotor of the wind turbine;

predicting a load and an associated load angle of the at least one rotor blade as a function of the edgewise blade moment and the blade flap moment of the at least one rotor blade, the load corresponding to a blade root resultant moment of the at least one rotor blade;

predicting a pitch angle of the at least one rotor blade of the wind turbine;

generating a load envelope for the component that comprises at least one load value for the pitch angle and the load angle; and, implementing a control action comprising pitching the at least one rotor blade when the load is outside of the load envelope.

10. The system of claim 9, wherein the component comprises at least one of a rotor blade, a pitch bearing, or a hub of the wind turbine.

11. The system of claim 9, wherein the plurality of operating parameters of the wind turbine further comprise at least one of the following: thrust, loads, power, speed, gravity, pitch angle, nodding moment, overhang moment, bearing lubrication schedule, a rotor azimuth angle, or a yawing moment.

12. The system of claim 9, the plurality of operations further comprising calculating the edgewise blade moment of the at least one rotor blade as a function of the plurality of operating parameters and estimated states of the wind turbine.

13. The system of claim 12, wherein predicting the load and the associated load angle of the at least one rotor blade as a function of the edgewise blade moment and the blade flap moment of the at least one rotor blade further comprises:

calculating the associated load angle by dividing the blade flap moment of the rotor blade by the edgewise blade moment of the rotor blade; and, calculating the load as a function of the associated load angle.

14. The system of claim 9, wherein predicting the pitch angle of the at least one rotor blade of the wind turbine further comprises calculating the pitch angle of the at least one rotor blade of the wind turbine based on one or more controller commands.

15. The system of claim 9, wherein the one or more sensors comprise proximity sensors.

16. The system of claim 9, wherein implementing the control action when the load is outside of the load envelope further comprises at least one of collective pitching of a plurality of rotor blades of the wind turbine, independently pitching each of the plurality of rotor blades, or cyclically pitching each of the plurality of rotor blades.

* * * * *